June 21, 1966  G. J. PRIMAK  3,257,218
METHOD FOR THE PRODUCTION OF CASTING SLIP
Filed June 5, 1963
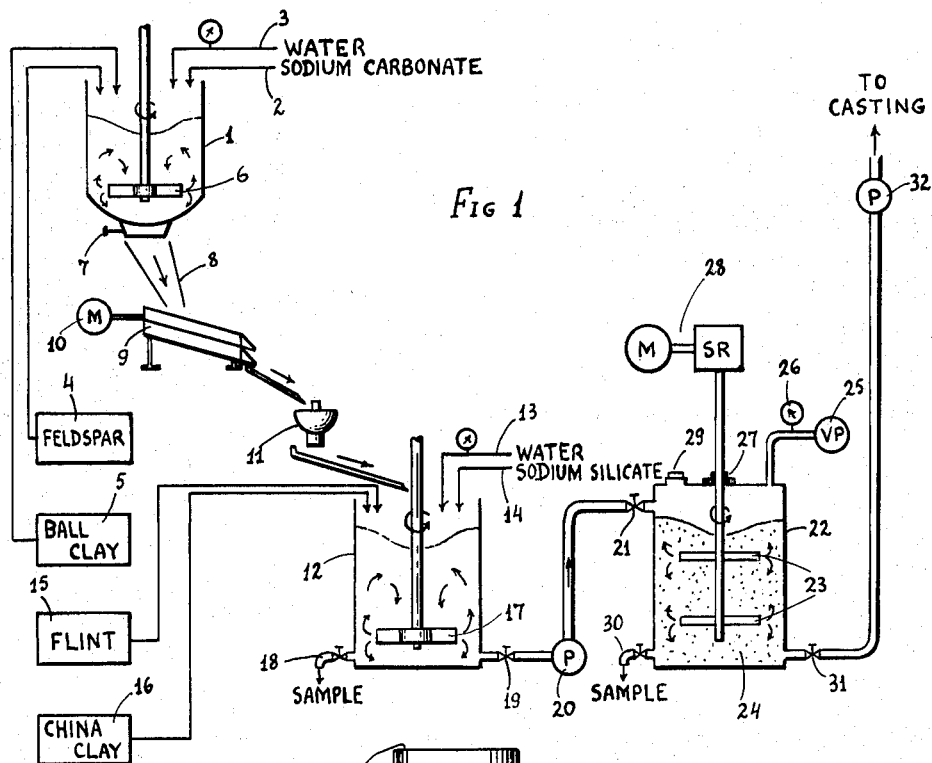
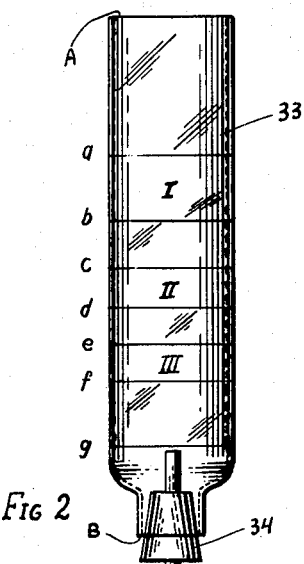
INVENTOR
George J. PRIMAK
BY
ATTORNEYS

United States Patent Office 3,257,218
Patented June 21, 1966

3,257,218
METHOD FOR THE PRODUCTION OF CASTING SLIP
George J. Primak, 305 Regent Ave., St. Lambert, Quebec, Canada
Filed June 5, 1963, Ser. No. 285,734
Claims priority, application Canada July 11, 1962, 853,535
13 Claims. (Cl. 106—73)

This invention relates to a new method and apparatus for producing casting slip used in the manufacturing of ceramic ware and more particularly vitreous china or sanitary ware.

The most common process used at present for producing casting slip comprises: slowly blunging china and ball clays with non-plastics (flint, feldspar, etc.) and a large excess of water; agitating the obtained mixture preferably overnight to produce a substantially homogeneous mass; then passing the obtained product through a set of screens and magnetic separators to separate coarse particles and magnetic material; slowly re-mixing the produced liquid slip to keep it in a homogeneous state; filter-pressing said liquid slip to obtain solid slip cakes; and then, finally, blunging said cakes with an appropriate amount of water and deflocculents to produce the casting slip. Furthermore, after the last blunging operation, which is usually quite slow and long, it is necessary to pass the casting slip through another set of screens to eliminate lumps which may have remained, and to re-agitate the screened slip to make it perfectly uniform, before passing it to the storage tanks from which it is distributed to the casters.

As it can easily be anticipated from the above description, this known manner of producing casting slip is very long and expensive, requiring manual handling not only during the charging of raw materials (china clays, ball clays, non-plastics, etc.) into the blungers, but also during removal of the filter cakes from the filter-presses and their reloading into other blungers.

The blunging, mixing and agitating operations are done slowly to prevent a build-up of air bubbles in the final casting slip, which bubbles are usually considered as one of the major causes for having undesired pin-holes in the final fired product. Also, during the handling of the filter-cakes, different impurities may be inadvertently introduced into the casting blungers, and to remove them an additional screening operation is required. Finally, the deflocculents used during this process are crystalline hydrated sodium carbonate and liquid sodium silicate having a ratio from 

$$\frac{1}{1.6} \text{ to } \frac{1}{4}$$

depending on the desired deflocculating activity.

The hydrated sodium carbonate has a large and often variable amount of water of hydration which makes the actual quantity of sodium carbonate in the compound uncertain as dehydration of the salt takes place continuously. This means that the adjustment of slip rheological properties (such as viscosity and thixotropy), with hydrated sodium carbonate, is difficult and inaccurate. On the other hand anhydrous sodium carbonate is not recommended for deflocculation of such slip because, before introduction, the solid deflocculent must be dissolved in as small an amount of water as possible.

The apparatus used for the production of such casting slip is too bulky as it comprises: primary blungers and agitators; screens and magnetic separators; another set of agitators; filter presses; transferring mechanism for filter cakes, from said presses to other blungers; another set of screens; casting slip agitators; and finally storage tanks. This equipment is heavy, takes a lot of space and requires constant mechanical supervision.

There has also been made an attempt to simplify the above described process by producing casting slip directly, without making the filter cakes.

According to this direct process, the raw materials including china clays, ball clays, non-plastics, and deflocculents and water in quantities slightly lesser than the required total amounts, are blunged together, and the produced mass is screened and passed through a magnetic separator before being introduced into an agitator or a storage tank where it is finally adjusted to required rheological conditions with the remaining water and deflocculents and then distributed to the casters.

This direct method is much simpler and utilizes less mechanical equipment, however, it has a number of disadvantages. The slip produced by this method is usually of lower quality than that obtained by the previous process and the final fired ware has usually more defects such as cracks, pinholes, etc. This is probably due to the fact that the blunging operation is either incomplete, if effected slowly, or produces a great deal of air-bubbles in the casting slip, if effected quickly. In both cases the obtained casting slip is of inferior quality.

Also, as it may be expected, the blunging and screening procedures of this direct slip are difficult and require a lot of energy because the amount of water and deflocculents employed is not sufficient to make the slip fluid enough to perform these operations with ease.

The object of the instant invention is to overcome all these disadvantages and to provide a process and an apparatus capable to produce casting slip of high quality as well as quickly and efficiently.

As in the known processes, the casting slip, according to the invention, is produced from raw materials comprising at least flint, feldspar, ball clays, china clays, water and deflocculents. Other ingredients such as whiting and lime may also be added in very small proportions.

The deflocculents used in accordance with the instant invention are preferably soda ash or anhydrous sodium carbonate and liquid sodium silicate preferably having the ratio of

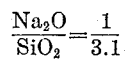

$$\frac{Na_2O}{SiO_2} = \frac{1}{3.1}$$

The proportions of the deflocculents used are suitably

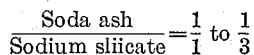

$$\frac{\text{Soda ash}}{\text{Sodium silicate}} = \frac{1}{1} \text{ to } \frac{1}{3}$$

The novel process essentially comprises dissolving all soda ash, it is desired to use, in water the amount of which should be slightly smaller than the total amount required in the process; then adding into the obtained solution the ball clays and flint or feldspar, or a part of each, while vigorously agitating until a light homogeneous suspension is obtained; screening this suspension and effecting a magnetic separation thereof; actively mixing said suspension while adding the rest of the raw materials, along with sodium silicate and the remaining amount of water; and finally slowly agitating the obtained slip while subjecting it to a vacuum.

According to this process, it is quite efficient to use anhydrous sodium carbonate since the amount of water in which it is dissolved is much greater than that required for its full dissolution (1 part of anhydrous sodium carbonate dissolves in 3.5 parts of cold water). In the known processes, on the other hand, sodium carbonate is introduced into the slip itself, in which case it must already be in solution. In these circumstances, it is not advisable to dissolve anhydrous sodium carbonate in a relatively large amount of water before its introduction into the slip because such operation will disturb the viscosity and specific gravity of said slip and will render the control of these properties extremely difficult. Thus, in such prior art cases, it is much more preferable to utilize sodium carbonate decahydrate which is soluble 1 part in 0.25 part of boiling water, in spite of its previously noted disadvantages. It is, of course, possible to use hydrated sodium carbonate in the novel process; however this would be less practical.

The mixing operations, except the final agitation under vacuum, are done quickly and vigorously and there is no difficulty in performing them. They also take comparatively little energy.

The last relatively slow agitation, under reduced pressure, is intended to obtain a fully homogeneous slip and to remove therefrom air-bubbles formed during the preceding fast mixings. Usually, however, this final agitation is effected for a short period of time whereafter the slip may be pumped to the casters.

It is preferable to use ball clays and feldspar as initial ingredients, which are introduced into the water with sodium carbonate dissolved therein, because feldspar may contain some iron material which would be removed during the magnetic separation.

Also slip which has previously been used (scrap slip) may be added in the amounts up to 10% during either the first or the second mixing.

The apparatus required to perform the above noted process is quite simple and efficient. It essentially consists of two fast agitators or mixers, preferably of turbine type; at least one screen, preferably a vibrating 75 to 150 mesh; at least one magnetic separator; and at least one storage tank under vacuum and with means to produce slow agitation therein, preferably of paddle type. Of course, pumps, conveyors, conduits and similar regular devices in this sort of processes are also required depending on the design of the plant and its output.

The invention will now be thoroughly described in reference to the drawings and examples.

In the drawings:

FIGURE 1 represents a diagrammatic illustration of one embodiment of the invention, and FIGURE 2 is a side view of a plastometer used to test the rheological properties of the slip.

In accordance with FIGURE 1, sodium carbonate 2 and water 3 are introduced into the mixer 1 with turbine blades 6 while vigorously agitating. Feldspar 4 and ball clays 5 are then conveyed into said mixer 1 in appropriate amounts and preferably in an alternating manner. This is vigorously mixed for about 1½ hours to produce a thin suspension. The mixing pattern in this mixer 1 is indicated by a plurality of arrows.

The valve 7 is opened and the suspension falls through the channel 8 onto a vibrating screen 9 activated by the motor 10. The screened material is then passed through a magnetic separator 11 whereafter it is introduced into the second mixer 12 with turbine blades 17.

Into this mixer 12 there are also charged flint 15 and china clay 16 as well as sodium silicate 14 and the remainder of water 13, while vigorously agitating. For these two agitations blades 6 and 17 may turn at a speed from about 200 to 1000 r.p.m. In mixer 12 the mixing pattern is also indicated by small arrows. The second mixing operation lasts again about 1½ hours.

A sample of the slip obtained may be extracted from the outlet 18, for testing purposes. In case the rheological properties are not to the point, they may be adjusted by adding further minor quantities of sodium silicate 14 and/or water 13 or, on the other hand, some scrap slip from a previous operation, and mixing for an additional half hour.

Then valves 19 and 21 are opened and the slip is transferred into a storage tank 22 by means of a pump 20. When the entire slip is in the tank 22 the pressure valve 21 is closed and the casting slip 24 is subjected to a vacuum of about 2 to 6″ Hg by means of a pump 25. The vacuum may be recorded by a gauge 26.

The casting slip 24, while being subjected to a vacuum, is also slowly agitated by paddles 23 to permit a better evacuation of the air bubbles therefrom. Said paddles may be activated by means of a motor and speed reducer 28 and may turn at a speed from about 20 to about 100 r.p.m. This operation lasts from approximately ½ to 1 hr. or, if necessary, longer.

The final casting slip may be tested by taking out a sample thereof through the outlet 30 and further adjustments may be done by introducing appropriate ingredients through the inlet 29 which is pressure locked during the de-aeration operation. In such cases a further agitation for about another ½ hr. would be required. Then, valve 31 is opened and the final casting slip is pumped by pump 32 to the casters.

Obviously while mixing in mixer 12 is performed, new materials may be charged into and mixed in mixer 1. Then, when the slip is transferred from mixer 12 into the storage tank 22, the transfer from mixer 1 into mixer 12 may be effected practically without any loss of time.

Also, it is preferably to have at least two storage tanks 22 so that while one is emptied the other may be filled with new slip from the mixer 12.

Of course, instead of feldspar, flint may be introduced into mixer 1, or part of flint and part of feldspar, and even a certain small amount of china clay may be incorporated therewith. However the coarse particles of feldspar or flint mixed with fine particles of the ball clay produce a very suitable uniform suspension which has no tendency to aggregate into lumps and which is easily screened and passed through magnetic separators. Also, if too much china clay is introduced with the ball clay into the first mixer 1 the amount of sodium carbonate usually used would not be sufficient to effect an adequate deflocculation of the resulting suspension.

If desired an additional screening and/or magnetic separation may be done between mixer 12 and storage tank 22.

FIGURE 2 shows a plastometer 33 which is probably the most commonly used instrument in testing the rheological properties of casting slip.

The plastometer 33 is made of glass and has black lines $a$, $b$, $c$, $d$, $e$, $f$ and $g$ etched thereon. At the bottom it is closed by a removable stopper 34 having a tube 35 in the middle thereof. The black etched lines $a$, $b$, $c$, $d$, $e$ and $f$ are made such a distance apart and the tube 35 has such an orifice that a Newtonian or true liquid would take exactly the same period of time to flow through spaces I, II and III of said plastometer.

The line $g$ is used to adjust the upper edge of the tube 35 in relation thereto so that it remains substantially at the same level throughout all testing operations.

The measurement of viscosity is made by registering the time of flow of the slip between line $a$ and line $f$ in seconds. This time may be converted into centipoises by means of the Poiseuille's equation. However, since the two values are proportional, it is preferable, for practical purposes, to express the "viscosity" as time of flow in seconds.

The thixotropy of the slip or, in other words, its tendency to thicken upon standing, is also checked by this instrument. It is usually called the "build-up" of the slip and is expressed as the difference in the time of flow in seconds between the time it takes the slip to flow through section III of the plastometer and that through section I.

The plastometer is completely filled with casting slip before the latter is permitted to flow and the readings are registered by means of a stop-watch.

Apart from the plastometer there is also used a 500 cc. flask to determine the specific gravity of the slip. For practical purposes the specific gravity, common called "weight," is expressed in gm./500 cc.

Actually the plastometer is a well known instrument in the art and has been illustrated in FIGURE 2 only for the purpose of helping to understand the meaning of the readings given in the following examples.

The plastometer 33 used to test the rheological properties, namely "viscosity" and "build-up" of casting slip in the examples, had the following dimensions:

|  | Mm. |
| --- | --- |
| Total length from A to B | 200 |
| Distance from A to $a$ | 45 |
| Distance from $a$ to $b$ | 25 |
| Distance from $b$ to $c$ | 20.5 |
| Distance from $c$ to $d$ | 19.3 |
| Distance from $d$ to $e$ | 15.2 |
| Distance from $e$ to $f$ | 15 |
| Distance from $f$ to $g$ | 25 |
| Distance from $g$ to B | 35 |
| Inside diameter | 43 |
| Outside diameter | 48 |

The plastometer consisted of heat resistant glass cylinder open and fire polished at the top and closed by No. 3 stopper and tube at the bottom, the tube 35 being of brass and having an internal diameter of 0.62 cm. and a length of 6.4 cm.

EXAMPLE 1

Casting slip was prepared according to one of the known processes, namely by slowly blunging all ingredients together in a large excess of water, screening and filter-pressing to produce cakes, and mixing said cakes with appropriate amount of water and deflocculents to obtain the casting slip.

The following initial formula was used:

| Ingredients: | Quantity |
| --- | --- |
| English ball clays | pounds__ 1340 |
| English china clays | do____ 1995 |
| Flint | do____ 1490 |
| Feldspar | do____ 1360 |
| Whiting | do____ 16 |
| Lime | do____ 5 |
| Water | Approx. gal__ 600 |

This was blunged for about 3–5 hours, transferred to agitators, and agitated therein overnight. Then, after screening and magnetic separation, the obtained "raw slip" was filter-pressed and cakes were obtained. These cakes were reintroduced into other blungers along with water and deflocculents in the following amounts:

| Filter cakes | lbs__ 7,500 |
| --- | --- |
| Water | gal__ 50 |
| Sodium carbonate, decahydrate (dissolved in a little hot water) | lbs__ 8–8.5 |
| Sodium silicate | lbs__ 8–8.5 |

$$\left(\frac{Na_2O}{SiO_2}=\frac{1}{3.1}\right)$$

After further agitation etc., the obtained slip had the following properties:

| "Weight" | 924±2 gm./500 cc. |
| --- | --- |
| Plastometer "viscosity" | 81.5 sec. |
| Plastometer "build-up" | 1.7 sec. |

This slip was used to cast test bars and a number of pieces of whiteware which were glazed and fired in a tunnel kiln with a maximum temperature of about 2350–2400° F. The comparative results are tabulated in Table I.

EXAMPLE 2

Casting slip was prepared according to another known process, namely by directly blunging all ingredients, screening and effecting a magnetic separation and finally agitating the obtained slip while adjusting it to required weight and rheological conditions with an additional quantity of water and deflocculents.

The following initial formula was used:

| Ingredients: | Quantity |
| --- | --- |
| English ball clays | pounds__ 1795 |
| English china clays | do____ 1455 |
| Flint | do____ 1410 |
| Feldspar | do____ 1700 |
| Whiting | do____ 17 |
| Sodium carbonate (anhydrous) | do____ 6.5 |
| Sodium silicate | do____ 17 |

$$\left(\frac{Na_2O}{SiO_2}=\frac{1}{3.1}\right)$$

| Water | gal__ 165 |
| --- | --- |

After blunging this mixture for about 5–10 hours and passing it through screens and magnetic separators, the obtained slip was transferred to an agitator where another 10 gal. of water and 1.5 lbs. of sodium silicate were added.

The obtained casting slip had the following properties:

| "Weight" | 924±2 gm./500 cc. |
| --- | --- |
| Plastometer "viscosity" | 62.5 sec. |
| Plastometer "build-up" | 1.2 sec. |

This slip was again used to cast test bars and a number of pieces of whiteware which were glazed and fired in a kiln similar to that of Example 1. The results are also tabulated in Table I.

EXAMPLE 3

Casting slip was prepared in accordance with an embodiment of the instant invention.

The initial formula was:

| Ingredients: | Quantity |
| --- | --- |
| English ball clays | lbs__ 1310 |
| Feldspar | lbs__ 1416 |
| Water | gal__ 160 |
| Sodium carbonate (anhydrous) | lbs__ 5 |

After mixing for about 1½ hours, in a turbine mixer at a speed of about 400 r.p.m., passing through a 100 mesh screen and a magnetic separator, the obtained thin suspension was introduced into a second turbine mixer whereto the following ingredients were also added:

| Ingredients: | Quantity |
| --- | --- |
| English china clays | pounds__ 1095 |
| Flint | do____ 1175 |
| Sodium silicate | do____ 14.5 |

$$\left(\frac{Na_2O}{SiO_2}=\frac{1}{3.1}\right)$$

| Water | gal__ 5 |
| --- | --- |

This was mixed at a speed of about 600 r.p.m. again for approximately 1½ hours and transferred to a storage tank under about 4″ Hg of vacuum. There, the obtained casting slip was slowly agitated for about 1 hour.

The properties of said slip were:

| "Weight" | 924±2 gm./500 cc. |
| --- | --- |
| Plastometer "viscosity" | 68.5 sec. |
| Plastometer "build-up" | 1.4 sec. |

This casting slip was used to cast test bars and a number of pieces of whiteware which were subsequently glazed and fired in a kiln similar to that of Examples 1 and 2. The comparative results are tabulated in Table I.

These results consisted in determining in a well known manner to the man of the art the comparative physical properties, such as, drying shrinkage, firing shrinkage, total shrinkage, loss on ignition, warpage, green modulus of rupture, fired modulus of rupture, as well as the percent of pieces of whiteware which were perfect, good but of inferior quality and those that were lost or had to be refired after minor repairs.

Table I

| Properties and results | Pieces cast with slip of Example 1 | Pieces cast with slip of Example 2 | Pieces cast with slip of Example 3, or according to this invention |
|---|---|---|---|
| Drying shrinkage, percent | 2.49 | 4.0 | 3.20 |
| Firing shrinkage, percent | 9.72 | 10.0 | 9.85 |
| Total shrinkage, percent | 11.97 | 13.0 | 12.75 |
| Loss on ignition, percent | 6.95 | 7.0 | 6.90 |
| Absorption, percent | 0.04 | 0.01 | 0.02 |
| Warpage, inches | 0.20 | 0.3 | 0.3 |
| Green modulus of rupture, p.s.i | 212 | 275 | 240 |
| Fired modulus of rupture, p.s.i | 9,766 | 10,000 | 9,900 |
| Perfect pieces, percent | 74 | 55 | 80 |
| Pieces of lower quality, percent | 2 | 5 | 1 |
| Pieces that must be repaired or refired "refires," percent | 18 | 30 | 15 |
| Losses before firing, percent | 2 | 4 | 2 |
| Losses after firing, percent | 4 | 6 | 2 |
| Total losses, percent | 6 | 10 | 4 |

The above table clearly shows that the casting slip of the instant invention produces results which are favourably comparable to those obtained with slips prepared by the known methods.

The large percent of "refires" produced by the slip of Example 2 is mostly due to pin holes in the finished ware. These in turn are probably at least partly caused by that said slip is agitated quite vigorously during its manufacture but is not deaerated before being sent to the casters.

The physical properties of the slip produced by the new process, determined by making a set of bars and submitting them to different tests, are also well within the usually acceptable limits and are comparable to those of the slips obtained by known methods.

It is to be noted that depending on the kind of ball clays and china clays as well as on the required properties and firing temperature, the overall formula of the slip produced by the new method may advantageously be as follows:

Ingredients:                      Percent, dry basis
- Ball clays                          26–22
- China clays                        22–26
- Flint                                23.5–28.5
- Feldspar                           28.5–23.5 and a sufficient amount of water and deflocculents to obtain desired specific gravity and rheological properties, which are preferably:

- "Weight"                           924±2 g./500 cc.
- Plastometer "viscosity"            60 to 80 sec.
- Plastometer "build-up"            1.4 to 1.8 sec.

The amount of water and deflocculents as well as the ratio of sodium carbonate to sodium silicate depend on the desired properties of the slip, the temperature of the kiln at which the cast articles are fired, the constitution of the clays used, the allowed casting time, the chemical composition of the deflocculents, and other variables which are well known in the art and which may easily be adjusted.

It will of course be understood that the invention is not limited to the embodiment described in the Example 3 or illustrated in FIGURE 1 of the drawings, but that different modifications evident to those skilled in the art may be done without departing from the scope of the invention as defined in the appended claims.

I claim:

1. A method of producing casting slip for the manufacture of ceramic ware from raw materials consisting essentially of predetermined amounts of ball clays, china clays, flint, feldspar, water and deflocculents consisting of sodium carbonate and liquid sodium silicate, comprising: in a first vessel dissolving the total predetermined amount of sodium carbonate in an appropriate amount of water which is slightly less than the total predetermined amount; adding the ball clays and feldspar and vigorously mixing until a thin homogeneous suspension is obtained; screening and effecting a magnetic separation of said suspension; transferring said suspension into a second vessel; adding to said suspension in said second vessel the china clays, flint and liquid sodium silicate and the remaining small amount of water which was not included for producing the solution of sodium carbonate and re-mixing vigorously until a homogeneous slip is produced; transferring said homogeneous slip into a third vessel; and subjecting said slip in said third vessel to a vacuum while it is being slowly agitated to remove air bubbles therefrom formed during the previous vigorous mixings.

2. A method as claimed in claim 1, wherein other raw materials selected from the group consisting of whiting and lime are incorporated into the slip in minor proportions and wherein said other raw materials are added into the aqueous solution of sodium carbonate in the first vessel along the ball clays and feldspar.

3. A method as claimed in claim 1, wherein other raw materials selected from the group consisting of whiting and lime are incorporated into the slip in minor proportions and wherein said other raw materials are added into the suspension in the second vessel.

4. A method as claimed in claim 1 wherein scrap slip is also added in minor proportion into the aqueous solution of sodium carbonate in the first vessel along with the ball clays and feldspar.

5. A method as claimed in claim 1 wherein scrap slip is also added in minor proportion into the suspension in the second vessel.

6. A method of producing casting slip for the manufacture of ceramic ware from raw materials consisting essentially of predetermined amounts of ball clays, china clays, flint, feldspar, water and deflocculents consisting of sodium carbonate and liquid sodium silicate, comprising: in a first vessel dissolving the total predetermined amount of sodium carbonate in an appropriate amount of water which is slightly less than the total predetermined amount; adding the ball clays, the feldspar and a small proportion of the china clays and vigorously mixing until a thin homogeneous suspension is obtained; screening and effecting a magnetic separation of said suspension; transferring said suspension into a second vessel; adding to said suspension in said second vessel the remaining major portion of the china clay, flint, liquid sodium silicate and the remaining small amount of water which was not included for producing the solution of sodium carbonate and re-mixing vigorously until a homogeneous slip is produced; transferring said homogeneous slip into a third vessel; and subjecting said slip in said third vessel to a vacuum while it is being slowly agitated to remove air bubbles therefrom formed during the previous vigorous mixings.

7. A method as claimed in claim 1, wherein sodium carbonate is anhydrous sodium carbonate.

8. A method as claimed in claim 1, wherein liquid sodium silicate has the $$\frac{Na_2O}{SiO_2} \text{ ratio of } \frac{1}{3.1}$$

9. A method of producing casting slip for the manufacture of ceramic ware from raw materials consisting essentially of predetermined amounts of ball clays, china clays, flint, feldspar, water and deflocculents consisting of sodium carbonate and liquid sodium silicate, comprising: in a first vessel dissolving the total predetermined amount of sodium carbonate in an appropriate amount of water which is slightly less than the total predetermined amount; adding the ball clays and feldspar and vigorously mixing until a thin homogeneous suspension is obtained; screening and effecting a magnetic separation of said suspension; transferring said suspension into a second vessel; adding to said suspension in said second vessel the china clays, flint and liquid sodium silicate and re-mixing vigorously until a homogeneous slip is produced; adding the remaining small amount of water which was not included for producing the solution of sodium carbonate into the second vessel at the end of the re-mixing operation to adjust the slip to a desired specific gravity; transferring said slip into a third vessel; and subjecting said slip in said third vessel to a vacuum while it is being slowly agitated to remove air bubbles therefrom formed during the previous vigorous mixings.

10. A process as claimed in claim 1, in which the obtained slip is subjected to a vacuum of 2 to 6″ Hg.

11. A method according to claim 1, wherein the raw materials are in the following proportions:

| Raw materials: | Percent by weight on dry basis |
| --- | --- |
| Ball clays | 22–26 |
| China clays | 26–22 |
| Flint | 23.5–28.5 |
| Feldspar | 28.5–23.5 | and sufficient amounts of water and deflocculents to obtain desired specific gravity and rheological properties.

12. A method of producing casting slip for the manufacture of ceramic ware from raw materials consisting essentially of predetermined amounts of ball clays, china clays, flint, feldspar, water and deflocculents consisting of sodium carbonate and liquid sodium silicate, comprising: in a first vessel dissolving the total predetermined amount of sodium carbonate in an appropriate amount of water which is slightly less than the total predetermined amount; adding the ball clays and flint and vigorously mixing until a thin homogeneous suspension is obtained; screening and effecting a magnetic separation of said suspension; transferring said suspension into a second vessel; adding to said suspension in said second vessel the china clays, feldspar and liquid sodium silicate and the remaining small amount of water which was not included for producing the solution of sodium carbonate, and re-mixing vigorously until a homogeneous slip is produced; and subjecting said slip to a vacuum while it is being slowly agitated to remove air bubbles therefrom formed during the previous vigorous mixings.

13. A method of producing casting slip for the manufacture of ceramic ware from raw materials consisting essentially of predetermined amounts of ball clays, china clays, flint, feldspar, water and deflocculents consisting of sodium carbonate and liquid sodium silicate, comprising: in a first vessel dissolving the total predetermined amount of sodium carbonate in an appropriate amount of water which is slightly less than the total predetermined amount; adding the ball clays and a mixture of flint and feldspar consistuting a portion of the total predetermined amounts of these materials and vigorously mixing until a thin homogeneous suspension is obtained; screening and effecting a magnetic separation of said suspension; transferring said suspension into a second vessel; adding to said suspension in said second vessel the china clays, the remaining portion of flint and feldspar, the liquid sodium silicate and the remaining small amount of water which was not included for producing the solution of sodium carbonate, and re-mixing vigorously until a homogenous slip is produced; and subjecting said slip to a vacuum while it is being slowly agitated to remove air bubbles therefrom formed during the previous vigorous mixings.

References Cited by the Examiner

UNITED STATES PATENTS

| | | | |
| --- | --- | --- | --- |
| 1,203,011 | 10/1916 | Kirk | 106—72 |
| 1,569,251 | 1/1926 | Austin | 106—72 |
| 2,268,131 | 12/1941 | Barker et al. | 106—72 |
| 2,413,330 | 12/1946 | Miller | 106—71 |
| 2,907,666 | 10/1959 | Millman et al. | 106—72 |
| 2,968,472 | 1/1961 | Barnett | 259—2 |
| 3,063,683 | 11/1962 | Westbrook | 259—2 |

TOBIAS E. LEVOW, *Primary Examiner.*

SAMUEL H. BLECH, *Examiner.*

J. E. POER, *Assistant Examiner.*